United States Patent Office 3,250,654
Patented May 10, 1966

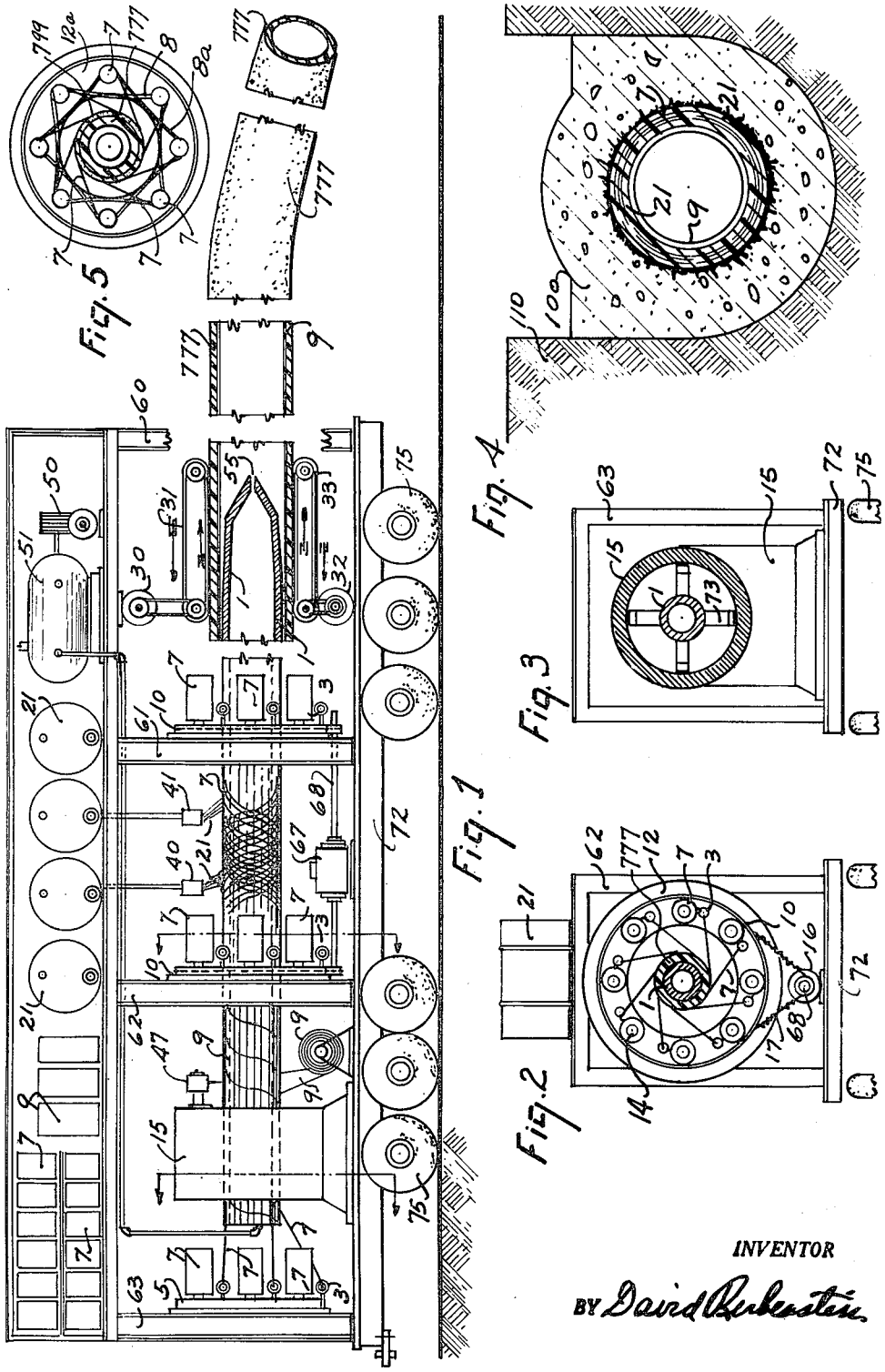

3,250,654
METHOD OF FORMING A FILAMENT WOUND PIPE LINER TO BE USED IN CONCRETE PIPE CONSTRUCTION
David Rubenstein, 2750 2nd Ave., San Diego, Calif.
Filed Aug. 25, 1964, Ser. No. 391,987
9 Claims. (Cl. 156—171)

This application is a continuation-in-part to my prior application Serial No. 702,050, filed Dec. 11, 1957, and now U.S. Patent No. 3,177,902, and which in turn is a continuation-in-part to my prior filed application Serial No. 229,852, filed June 4, 1951 and now U.S. Patent 2,850,890 wherein is found basic disclosures to the art of prestressing concrete construction by force systems induced by chemical means, e.g., polymerization reactions of polymeric resin systems, said disclosures being found in said U.S. Patent No. 2,850,890; col. 3, lines 7–75; col. 4, lines 1–37; col. 11, lines 3–32, but not limited thereto.

This invention relates to prestressed laminated pipes, tanks and vessels and method and apparatus for making the same.

An object of this invention is to provide apparatus for the manufacture of reinforced concrete or other porous structural material, pipes, tanks or vessels highly resistant to dynamic loads, cracking and substantially impervious through the walls of such pipes, tanks or vessels to infiltration or transmission of fluid contained or flowing through such pipes.

Another object of this invention provides methods of manufacture of prestressed resin reinforced concrete or other porous structural material pipes, tanks or vessels utilizing apparatus of this invention.

Another object is to use apparatus of the invention to reinforce the interior or the exterior surface and body materials composing the structure of the invention.

By virtue of this invention the continuous manufacture of prestressed preloaded concrete pipe, vessels and tanks may be made in situ in excavated earth trenches, or the like, prepared and provided in advance of placing of reinforced plastic construction made by or on the apparatus of the invention. Such excavated trenches are provided by known means, as e.g., power driven ditching machines, not shown.

This invention also makes pipes, tanks and vessels with properties and characteristics tailored to particular requirements of use. It is possible in this invention to accentuate any desirable characteristics such as resiliency, moisture and fluid resistance, shock proofing, lightweight, thermal insulation, or thermal conductivity, smoothness, load bearing capabilities in comperssion tension, shear and torsion. In addition, pipes, tanks and vessels may be made chemically resistant in a selective manner to adverse chemicals, or fire proof or fire resistant.

These and other objects will be apparent from the drawing and the following description thereof. Referring to the drawings which are for illustrative purposes of embodiments of the invention:

FIGURE 1 is a diagrammatic view of apparatus of the invention.

FIGURE 2 is a diagrammatic view of elevation of the spinning apparatus.

FIGURE 3 is a sectional elevation of the "torpedo holding means" and torpedo in section.

FIGURE 4 is a cross section of finished product.

Generally the apparatus comprises means to continuously make reinforced plastic tubular structures. The reinforced plastics used comprise polymeric resinous compositions which may have fillers therefor, and unidirectional fibrous materials. The polymeric resinous materials are selectively used and may be thermosetting resinous materials or thermoplastic resinous materials, or elastomeric materials, or rubber or rubbery materials and such materials may be each used alone or in compatible combinations. Such materials are illustrated by unsaturated polyester resins, epoxy resins, polyurethane resins, polyvinyl chloride resins, etc., but not limited thereto since constant improvements and inventions of polymeric resins and materials will be made possible as the art progresses and such materials will be useful in the practice and use of this invention.

Exemplary of the invention uses is that related to the manufacture of concrete pipe in situ. The present state of the art enables the manufacture of poured-in-place concrete pipe but such pipe is generally restricted to uses as irrigation pipe or uses which do not have pressure requirements. Known machines and apparatus provide such poured-in-place concrete pipe. This invention provides the means to reinforce such constructions of pipe, or vessels or tanks by providing high strength polymeric resin bonded fibers such as fiberglass, polyethylene terephthalate (Dacron) or other synthetic fibers. Metal wires such as steel, stainless steel, aluminum, beryllium, titanium or other so-called exotic metal wires or fibers also may be used as reinforcing placed and integrated into the pipe structures for which this apparatus provides means of manufacture.

Additionally, composite concrete pipe structures comprised of combinations of concrete and e.g. fiberglass unidirectional fibers, stainless steel wire, and resistance wire elements may be manufactured on the apparatus of this invention. No limitation is expressed or intended for the polymeric resinous materials or other binders found useful in their combination with inorganic fibers exampled by fiberglass fibers, quartz fibers, ceramic fibers (but not limited thereto).

Additionally, composite structures may be made by this apparatus using tapes, belts or multiple stranded materials because the winding and placing means has these capabilities.

Synthetic fibers, inorganic fibers, or organic fibers all have a place in the structures which this apparatus makes and no limitation on fibers or wires is intended.

Referring to FIGURE 1, the apparatus of the invention comprises a trailer or truck type vehicle for transporting the apparatus to the site of use and such trailer or truck type vehicle then travels and straddles or parallels a pre-dug trench and lays into the trench a pre-determined sized and structurally designed tubular construction which in the manufacture of an irrigation pipe line, or an oil field pipe line, or e.g., a chemical process pipe line comprises the product made on the apparatus of this invention. In the trench at place of use such a tubular construction may be covered with a concrete pipe body to provide protective cover, or in the case of manufacture of prestressed concrete pipe provide with the concrete the prestressing reinforcement component of such a structure.

In FIGURE 1, element 1 represents the forming means called a "torpedo" upon which e.g. polymeric resinous material 21 embedded fiberglass fibers 7 are wound at a predetermined helical angle or otherwise determined "lay" of the fibers 7.

The first element wound or placed as a prepared tube comprises a polyethylene, or vinyl, or polyethylene terephthalate (Dacron) or Mylar sheet which is substantially airtight or made airtight from lay to lay by e.g. heat sealing. Element 47 illustrates a heat sealing device.

The "torpedo" 1 is secured in a substantially built holding ring device 15 which is so designed that the torpedo element 1 is maintained in cantilevered position fixed in place. This "torpedo" element does not rotate.

Adjacent to device 15 end frame 63 supports fixed-in-place creel holder 5 upon which reels of rovings 7 are placed. These reels of roving 7 are so placed that the roving strands 7 are fed through porcelain fitted eyes 3 and then placed over the polyethylene or other type liner 9 which acts as a release layer and are drawn forward for linear reinforcing if this type of reinforcing is required in any specific designed end product pipe as an additional reinforcing means to the helically or otherwise wound fibers 7.

At frame 62 the second stage of manufacture starts. On frame 62 there is mounted a revolving ring assembly 10 which is secured to frame 62 by holding ring 12 which has means for holding as well as means to enable ring assembly 10 to revolve on said holding ring 12.

Upon revolving ring 12 a plurality of spindle holders 14 are mounted. Upon these spindle holders 14 there are placed roving balls of fiberglass 7 or spools of synthetic fibers or wire. In some cases different reinforcing materials will be placed alternately on the spindle holders 14 so that a composite reinforcement can be built by the apparatus. Such a composite reinforcement could be fiberglass unidirectional strands 60 and 150 Owens-Corning fiberglass roving and next to it on alternate spindles reels of stainless steel wire #30 could be placed. Many composite structural reinforcements are thus available and no limitation is intended because structural engineers can and will design many kinds of composite reinforcements to meet requirements of many kinds of structural tubular embodiments.

Revolving ring 12 is driven at a predetermined speed by motor 17 which drives shaft 68 which drives gear 16 which drives chain 10.

Revolving ring 12 is arranged so that fibers 7 are helically or otherwise advanced on polyethylene film or otherwise covered "torpedo" 1 and these fibers 7 are laid in one or more layers to build up the required cross-section of reinforcing material. A revolving ring 12 is mounted on frame 61 and feeds its roving fiber 7 lays back under spray guns 40 and 41 while a revolving ring 12 mounted on frame 62 feeds its roving fiber 7 lays forward onto "torpedo" 1. This makes a composite lay of a plurality of strands of roving fibers 7 as the polymeric resin 21 composition used for binder is sprayed onto the lays of fiber 7 from spray means 40 and 41.

Variations in sequence of laying fibers 7 can be made so that different reinforcement constructions are made to meet many kinds of tubular structures needs.

The polymeric resinous compositions, such as unsaturated polyester resin compositions can be cured by ambient means as known in the art or they can be cured by heating means. Useful for this purpose are electrical radiant heating devices as made by Edwin J. Weigand and Company, Pittsburgh, Pa., and other manufacturers of such devices.

Heating can be provided by hot air blown into the "torpedo" 1 device. This hot air can heat the "torpedo" 1 from the inside to the laminated layer 777 as it is drawn across the "torpedo" 1 by means of rubber faced powered belts 31, or the like, powered by electric motor 30, and belt 33 powered by motor 32. A plurality of such belt-take-offs can be provided depending upon the size of the tubular construction 777.

In place of winding element 9 onto the "torpedo" 1 to provide release means for the finished product liner 777, the "torpedo" 1 can be covered with Teflon which provides a smooth non-sticking surface, or other known release agents.

"Torpedo" 1 near its outward end is slightly tapered to admit air pressure pumped into the finished product 777 which is able to provide release back over the "torpedo" 1 as well as provide pressure to strengthen the liner 777 while it lays in the prepared trench and while concrete is poured under, around and over the said liner 777. End means of closure are provided comprising end plugs having gasket and holding means known in the art.

Alternately, a sealed dome-like-end-plug can be formed on the liner 777 making it into a tank-like construction or vessel. Part 55 in the outward end of the "torpedo" 1 is sized and valved if desired, to regulate the flow of air into liner 777.

Air pressure is provided from an air compressor 50, or the like, through pipe into end port of "torpedo" 1, and valves may be provided at the intake end to control this pressure.

Of importance in this invention, the liner 777 is made as a continuously advancing member and is placed into a prepared pre-dug trench or, if desired on the surface of the ground or place of use, for later end use placement. Liner 777 by nature of the fibers and resins selected can be made as a "preimpregnated" partially cured product or it can be made as a finished ready-for-use liner 777. Requirements of the end use engineering will dictate the type of product made. The apparatus of this invention is so made that it serves multi-purpose needs and no restriction is intended nor made on the end-use products capable of being made by the apparatus and methods of this invention.

Referring now to FIGURE 2, here is shown a diagrammatic elevation view of frame 62 and the revolving ring assembly 12 having fiber 7 reel holding means 14.

Fibers 7 are shown being drawn from their spools through a porcelain eye means 3 (which can be other smoothed surface means, e.g. Teflon lined eyes), and from eyes 3 onto "torpedo" 1 so that lays of fiber 7 are built up to the required thickness to make liner 777.

If the structural design so requires, longitudinal fibers 7 are drawn from fixed holding ring 5 mounted on frame 63 and these longitudinal fibers 7 are advanced as the fibers 7 are spun helically, or otherwise, onto "torpedo" 1.

In FIGURE 2 motor 16 drives shaft 68 by means of chain drive 17 over sprocket on said shaft 68.

This is also shown in elevation on FIGURE 1 and shaft 68 is shown thereon as driving revolving ring 10 on both frames 61 and 62.

On both FIGURES 1 and 2 polymeric resins, etc., tanks 21 are shown and from these tanks formulated polymeric resin compositions, or rubbers, or elastomeric or rubbery compositions are drawn and placed by spray means illustrated by elements 40 and 41.

Alternately, but not shown, the fibers 7 may be drawn from and through a creel device which has in combination, a filament and wetting and impregnating means. This means can be provided to control the amount of polymeric resin composition, etc., used for binding the strands of fiber 7. Such fiber being unidirectional may also be tensioned by the apparatus.

Typical of such apparatus as components of this invention are "Kidde Creels," but not limited thereto, which e.g. can be supplied and equipped to deliver 200 ends of single end yarn and with tension devices suitable for operation.

In connection with such creels a compensator such as the C.T.C. compensator (controlled tension compensator) can be used (but not limited thereto) and thus provide a highly controlled fiber filament laying means.

The roving of fiberglass strands can be used as a preimpregnated roving which is cured with means such as heat or by application of an on-site spray-lay polymeric resin composition having a catalyst therefor, or resin accelerator and catalyst, or other known means. The roving of fiberglass strands can be alternatively provided dry from the roving balls as shown in FIGURE 1.

The use of a compensator like the C.T.C. compensator provides accurately controlled tension on unrolling or drawing of glass fibers as roving whether in a dry state or in a pre-impregnated state. Any useful fiber 7 can be controlled for "pay out" on an accurate basis and method.

A servo system may be employed as a closed mechanical loop acting through roller arms which serve the sensing element not drawn but known in the art. A braking system is provided which constantly adjusts itself by responding to the movement of the roller arms, which adjustment is transmitted back through a feed-back cable.

Filament winding of fibers 7 is provided with known device which has exceptionally good acceleration characteristics, due to the time delay provided by the storage capacity of the roller arms of apparatus available but not drawn.

Sensing rollers may be used with Teflon coating, Teflon sleeves, hard anodic coating, or in stainless steel.

The apparatus enables any helix angle ranging from 0° to 90° to be selected and incorporated into an accurately controlled pattern. High angle winding pattern is governed by separate gear train which may be engaged when required during fabrication.

In place of fibers 7 as alternate materials for winding purposes there may be used tapes of various known widths and construction, as e.g. woven fiberglass roving tapes, or jute and cotton tapes, or burlap woven tapes, or wire and fiberglass tapes, in fact, any materials alone or in desired engineered combinations can be utilized as ready-made-tapes and placed by means of the apparatus of this invention.

FIGURE 3 shows an elevation of frame 63 looking toward the beginning end of the "torpedo" 1 holder 15. "Torpedo" 1 holder 15 is a strong construction adapted to support "torpedo" 1 in a cantilevered position as shown in FIGURE 1. Holder 15 is shown having a circular opening of the size of the largest type of "torpedo" 1 that the apparatus is designed to use. For example, if the largest sized liner 777 is of a 60 inch inside diameter and to have a 2″ thick wall, the holder 15 would have an inside diameter of 64″. From the dimension of 64″ diameter of holder 15 any smaller sized "torpedo" 1 may be used, e.g., a 48″ diameter, or a 24″ diameter, or a 12″ diameter "torpedo" 1 may be used by means of supports 73 shown in FIGURE 3. These supports may be screw jacks, or hydraulic jacks or air pressure devices adapted to hold rigid and in place the size "torpedo" 1 then being used.

In order to illustrate the component parts of the apparatus apparent dimensions are "stretched out," but it is contemplated that the apparatus can be substantially condensed in length and thus make for rigid and accurately working construction. Trailer or truck bed 72 is shown supporting frames of the apparatus as e.g., frame 63. Tires or other moving means, e.g., Caterpillar tractor means, etc. is represented by element 75.

FIGURE 4 is a sectional view of a cross-section of the finished product 777 in place as a liner for a poured-in-place concrete pipe or conduit. Such a product is of great use in irrigation systems, or water supply systems, or sewer systems, or oil field pipe lines, or in fact any chemical fluid pipe line of substantial length. The reduction in costs of such construction can be very substantial and the reliability and usefulness of piping systems, or tanks, or vessels improved by the apparatus manufacturing means of manufacture of this invention.

Tankage can be made on a continuous production basis and such construction cut to desired lengths at will and have end closures bonded in place, or otherwise made in place. Piles for concrete footings, etc. can be fabricated as well.

Alternately, the laminated layer 777 may be drawn across or from the "torpedo" 1 by means of rubber faced or otherwise adapted friction inducing take-off belts such as belts 31 and 33. In place of individual motor drive these powered belts 31 and 33 can be powered by phase gear control take-off from single power source which would drive both rotating rings 10 and take-off belts 31 and 33, thus maintaining mechanical integrity throughout fabricating cycle.

This feature is particularly important because variations in helical angles can be readily made without having to synchronize elements of the apparatus. Belts 31 and 33 automatically adjust to forming speeds and laying speeds of the fiber 7 placement.

The ease with which helically formed fibers 7 are made on this apparatus also provides with another type of revolving ring apparatus the capability of making sleeve-type interwoven constructions from fiber contained on reels mounted on this revolving type of ring as shown in FIGURE 5.

In FIGURE 5 the revolving ring 12a contains grooves 8 and 8a in which unidirectional fiber strands 7 travel in opposite directions so these said fiber strands 7 are placed on "torpedo" 1 as woven sleeving 799.

So sleeving can be made to adjust in diameter and because wet impregnated fibrous construction can be formed by pressure means, a construction may be made by the apparatus of this invention which includes expanding a liner type product or a specifically designed formed product that may be enlarged or formed against a containing die mold and by means e.g., air pressure, made to the shape provided by the die or mold.

The mold or die may encircle the "torpedo" 1 and be a circular shape as is required in making a venturi section of a pipe line. The mold or die may be irregularly shaped to conform the wet impregnated fibrous construction contained e.g., in a sleeving type construction wound onto the product 777 and provide a manhole element of a pipe line, or may make formed products of many types, e.g., tankage, storage vessels, car bodies, boats, military materiel, chemical vessels such as funnels, process vessels, etc.

The essential means provided by this invention is easy formability, variations of structure thickness and ability to provide bonded reinforcements that are structurally a part of the tubular construction.

Metal inserts, metal reinforcements, synthetic fibers adapted to resistances, and fillers of many kinds can be incorporated in the polymeric resin composition capable of being placed by the apparatus of this invention.

Air compressor 50 and the holding tank 51 provides means of inflation of elements such as FIGURE 5.

Payout device belts #31 and #33 may be additionally provided by guide contour shapes, as e.g., a venturi section of a pipe liner 777 can be frictionally moved from the "torpedo" 1 or the mold or die upon which its shape depends and is made.

No limitation is intended—shape of dies or molds within the capability of the removal of a product made on such apparatus.

The machine is not limited to circular pipe shapes but any reasonable shape such as squares, triangles, elliptical or depress elliptical, spheroid, paraboloid, conical shapes or combinations of shapes may be made in continuous process constructions by the machines of this invention.

Military supply lines can be easily manufactured in the field by the apparatus of this invention. These supply lines for fuel or other fluids may be utilized by use of the liners 777 alone, in which case, the product is reinforced polymeric resin fiber pipe lines.

The low cost of concrete as a protective cover enables thinner sections of liner or pipe 777 to be used and for irrigation purposes or pressure water lines the component structure of reinforced polymeric resin compositions and concrete appear as the low cost construction, particularly if long lengths are required.

The apparatus has been disclosed and features of the invention described but since many variations within the scope of the invention are possible, no limitation is intended to any use or feature within the scope of the invention.

Having thus disclosed the invention I claim:

1. The method of forming and moving a partially cured ready-for-use pipe-liner component comprising a polymeric resin composition embedded fiber material reinforcement pipe-liner component to be covered by and integrated to a poured-in-place concrete component which comprises the following steps:

Step (1) first applying a layer of mold release on the surface of a mandrel and, second, place forward moving starting strands of fiber reinforcing materials in position for spinning, and then spin, and lay, said strands at a selected helical angle around said mandrel over said layer of mold release until the required number of strands are laid; and while spinning the fiber reinforcing material onto the said mandrel, applying polymerizable polymeric resin composition to cover said surface of said mandrel and said strands of fiber reinforcement as they are being spun onto the said mandrel;

Step (2) with at least some of said forward moving strands of fiber reinforcing material laid onto said mandrel, place starting strands of said fiber reinforcing material in spinning cross-lay position at an equal but opposite helical angle to said first laid strands, and spin and lay, in reverse moving lay said strands at said selected cross-lay angle, and cover substantially all of said first laid fiber reinforcing material, and while spinning said cross-laid strands of said fiber reinforcing material, continue applying polymerizable polymeric resin composition to substantially cover said surface of all strands on said mandrel;

Step (3) while said spinning of said fiber reinforcement strands is being done, heating the mandrel to partially cure said polymerizable polymeric resin composition and form a bonded and integrated pipe-liner structure when cured in place with a poured-in-place concrete component;

Step (4) upon completion of said partial curing, bonding and integration, pump air through the mandrel to act as a cushion between the formed partially cured pipe-liner and the mandrel to aid in removing said partially cured pipe-liner and said air also enters said partially cured pipe-liner whereby said air acts as a load-bearing medium for said pipe-liner to a degree sufficient to aid in supporting the wall of said pipe-liner.

2. The method of forming and moving a ready-for-use pipe-liner as in claim 1, in which in addition to the said helically applied lays of fiber reinforcement material, at least one unidirectional and longitudinally placed reinforcing fiber strand is placed in a selected position.

3. The method of forming and moving a ready-for-use pipe-liner as in claim 1, in which said fiber reinforcement material comprises inorganic fibers selected from the group consisting of glass fibers, quartz fibers, and ceramic fibers.

4. The method of forming and moving a ready-for-use pipe-liner as in claim 1, in which said polymerizable polymeric resin composition comprises a polymeric resin selected from a group of thermosetting resins consisting of unsaturated polyester, epoxy and polyurethane resins.

5. The method of forming and moving a ready-for-use pipe-liner as in claim 1, in which in addition said reinforcement comprises a metallic reinforcement selected from the group consisting of steel, stainless steel, aluminum, beryllium, titanium, and exotic metal.

6. The method of forming and moving a ready-for-use pipe-liner as in claim 1, in which said fiber reinforcement includes fiber selected from the group consisting of glass, jute, and cotton, in the form of tapes and stranded material and combinations thereof.

7. The method of forming and moving a ready-for-use pipe-liner as in claim 1, in which said polymerizable polymeric resin composition belongs to a group consisting of thermosetting resins, thermoplastic resins and combinations thereof.

8. The method of forming and moving a ready-for-use pipe-liner as in claim 1, in which a film release material is wound around said mandrel, said film material being selected from the group consisting of polyethylene, polyethylene terephthalate, vinyl resins, and polytetrafluoroethylene.

9. The method of forming and moving a ready-for-use pipe-liner as in claim 1, in which the said polymerizable polymeric resin composition is cured by radiant means.

References Cited by the Examiner
UNITED STATES PATENTS

| | | | |
|---|---|---|---|
| 987,791 | 3/1911 | Bayne et al. | 156—431 |
| 1,340,836 | 5/1920 | Powell | 264—209 |
| 2,816,322 | 12/1957 | Bjorkstein | 264—209 |
| 3,067,803 | 12/1962 | Fleury | 156—431 |
| 3,068,133 | 12/1962 | Cilker et al. | 156—428 |

FOREIGN PATENTS

| | | |
|---|---|---|
| 645,213 | 7/1962 | Canada. |

EARL M. BERGERT, *Primary Examiner.*

P. DIER, *Examiner.*